(12) United States Patent
Trummer

(10) Patent No.: US 12,117,368 B2
(45) Date of Patent: Oct. 15, 2024

(54) DEVICE AND METHOD FOR DETECTING A LEAK

(71) Applicant: Johann Trummer, Gnas (AT)

(72) Inventor: Johann Trummer, Gnas (AT)

( * ) Notice: Subject to any disclaimer, the term of this patent is extended or adjusted under 35 U.S.C. 154(b) by 778 days.

(21) Appl. No.: 17/267,172

(22) PCT Filed: Jul. 18, 2019

(86) PCT No.: PCT/EP2019/069334
§ 371 (c)(1),
(2) Date: Feb. 9, 2021

(87) PCT Pub. No.: WO2020/030397
PCT Pub. Date: Feb. 13, 2020

(65) Prior Publication Data
US 2021/0302263 A1 Sep. 30, 2021

(30) Foreign Application Priority Data

Aug. 10, 2018 (EP) .................................... 18188445

(51) Int. Cl.
*G01M 3/28* (2006.01)
*E04D 13/00* (2006.01)
(52) U.S. Cl.
CPC ......... *G01M 3/2807* (2013.01); *E04D 13/006* (2013.01)
(58) Field of Classification Search
None
See application file for complete search history.

(56) References Cited

U.S. PATENT DOCUMENTS

| 3,254,526 | A | * | 6/1966 | Yarbrough | ........... G01N 21/894 |
| | | | | | 73/159 |
| 4,110,945 | A | | 9/1978 | Sheahan | |
| 4,965,554 | A | | 10/1990 | Darling | |
| 5,589,647 | A | * | 12/1996 | Jax | .......................... G01M 3/04 |
| | | | | | 73/31.07 |

(Continued)

FOREIGN PATENT DOCUMENTS

| CH | 664 184 | 2/1988 | |
| DE | 4134380 A1 * | 4/1993 | ............ E02D 31/00 |
| DE | 10 2011 086486 | 5/2013 | |

(Continued)

OTHER PUBLICATIONS

English Translation of DE-4134380-A1 (Year: 1993).*

(Continued)

*Primary Examiner* — Alexander A Mercado
(74) *Attorney, Agent, or Firm* — GREENBLUM & BERNSTEIN, P.L.C.

(57) ABSTRACT

A device, structure, use and method for detecting a leak in a building, particularly in a roof, and/or in a wall and/or a ceiling and/or a floor, particularly in a wet room, of the building, comprising at least one pipe in which a fluid can be conducted, wherein a suction device is in fluid connection with a first end of the at least one pipe. An absorbent material is provided and a second end of the at least one pipe is arranged such that the fluid can be removed from the absorbent material, and at least one measuring device for analyzing the fluid is in fluid connection with the pipe.

21 Claims, 2 Drawing Sheets

(56) References Cited

U.S. PATENT DOCUMENTS

Figure 1:
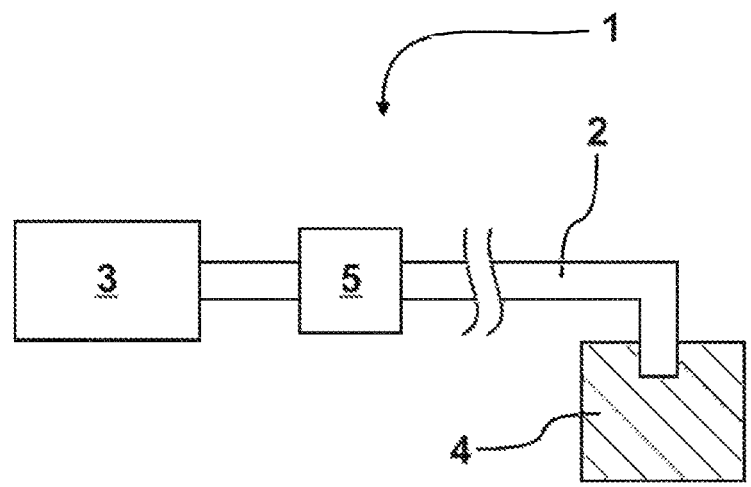

2012/0038912 A1* 2/2012 Yamada .................. G01M 3/16
356/240.1
2014/0311222 A1 10/2014 Decker et al.

FOREIGN PATENT DOCUMENTS

| EP | 2 458 106 | 5/2012 |
|----|-----------|--------|
| JP | S55-77167 | 11/1953 |
| JP | S58-20913 | 2/1983 |
| JP | S60-83939 | 6/1985 |
| JP | 2000-74772 | 3/2000 |
| JP | 2000--241286 | 9/2000 |
| JP | 2003232695 | 8/2003 |
| JP | 2014-533825 | 12/2014 |
| JP | 2016-102771 | 6/2016 |

OTHER PUBLICATIONS

International Search Report (Form PCT/ISA/210)conducted in Int'l Appln. No. PCT/EP2019/069334 (Oct. 14, 2019).
International Written Opinion (Form PCT/ISA/237) conducted in Int'l Appln. No. PCT/EP2019/069334 (Oct. 14, 2019).
International Preliminary Exam. Report (Form PCT/IPEA/409) conducted in Int'l Appln. No. PCT/EP2019/069334 (Aug. 11, 2020).
Translation of Russia Search Report conducted in counterpart Russia Appln. No. 2021105830/28 (Aug. 12, 2022).
Japan Office Action conducted in counterpart Japan Appln. No. 2021-507055 (Feb. 21, 2023) (w/ translation).
Japan Office Action conducted in counterpart Japan Appln. No. 2021-507055 (Nov. 5, 2023).

* cited by examiner

DEVICE AND METHOD FOR DETECTING A LEAK

The invention relates to a device for detecting a leak, particularly in roofs, and/or a leak in a wall and/or a ceiling and/or a floor, particularly in a wet room, comprising at least one pipe in which a fluid can be conducted, wherein a suction device is in fluid connection with a first end of the at least one pipe.

The invention furthermore relates to a structure, particularly a roof or a ceiling, a floor and/or a wall, particularly in a wet room, having a lower layer, an upper layer, and a device of this type.

In addition, the invention relates to a first use and a second use of a device of this type.

Finally, the invention relates to a method for detecting a leak, particularly in roofs, and/or a leak in a wall and/or a ceiling and/or a floor, particularly in a wet room, wherein a negative pressure is applied to at least one pipe using a suction device in order to convey a fluid through the pipe.

In buildings, unwanted ingresses of water normally result in damage, the repair of which is costly. Aside from serious flooding, which typically occurs suddenly, longer and less intense, yet continuous ingresses of water in particular can cause permanent building damage which, under some circumstances, is detected too late and can no longer be remediated. This can occur, for example, in the case of a persistent ingress of water in a basement or in the roof, wherein flat roofs are notoriously particularly affected by this.

From the prior art, devices for detecting a leak in roofs are known in which a negative or positive pressure is applied in order to detect the leak.

In one device according to CH 664 184 A5, roof elements which are sealed in a water-tight manner are provided with an inner cavity, wherein a pipe protrudes into the cavity and a negative pressure is applied to the cavity by means of a suction device. To detect the leak, the applied pressure is measured, with a change in the measured pressure indicating a leak.

A disadvantage here is that roof structures with a device of this type are costly to produce, since elements sealed in an air-tight manner are required. Additionally, with devices of this type, a leak is detected or indicated even when there is no moisture ingress or when a moisture ingress is negligible.

It is therefore the object of the invention to specify a device for detecting a leak in a building, with which device a leak can be detected reliably, at an early stage, and in a simple manner, particularly in a roof such as a flat roof.

A further object of the invention is to specify a structure having a device of this type, in which structure a leak can be detected and localized reliably, at an early stage, and in a simple manner.

It is also an object of the invention to specify a use for a device of this type.

Finally, an object of the invention is to specify a reliable and simple method for detecting a leak, with which method a leak that may need to be fixed is detected.

According to the invention, the first object is attained in that, with a device of the type named at the outset, an absorbent material is provided and a second end of the at least one pipe is arranged such that the fluid can be removed from the absorbent material, wherein at least one measuring device for analyzing the fluid is in fluid connection with the pipe. The fluid that is to be removed can be a gas, for example ambient air, or a liquid, for example water, in particular rainwater. The suction device is preferably embodied as a device for producing a negative pressure, for example a pump. Normally, the at least one pipe is embodied a hose or tube.

An advantage obtained with the device according to the invention is primarily that the liquid which seeps through the leak into an intermediate space, for example, is absorbed by the absorbent material. Thus, in the region of the absorbent material, a humidity is increased which can be measured as a result of the measuring device. Thus, a system which is enclosed in an air-tight manner, in which system a pressure applied by the suction device is measured, is not necessary. A device of this type is particularly suited for detecting a leak in a roof and/or detecting a leak or emerging moisture on or inside of a wall, a floor, or a ceiling. This can be expedient in wet rooms in particular, such as bathrooms for example, in order to detect a leak in a water pipe at an early stage, for example.

At least one pipe means that a single pipe can be provided. However, multiple pipes can also be provided. With multiple pipes, all of the pipes or only some of the pipes can have the features explained below.

It is beneficial if the fluid, in particular the air, is conducted from the absorbent material to the measuring device through the pipe. In this manner, a leak via which the liquid enters, for example, can be detected at an early stage through a measurement of physical variables, such as temperature or humidity. A leak that is merely air-permeable, but is liquid-tight, is not detected with a device of this type. However, such a leak, for example in a roof, also does not typically require a repair.

To enable a leak detection in a large region, it can be provided that the absorbent material is embodied to be planar. The absorbent material preferably comprises a capillary-forming coat or layer. It has proven effective if that absorbent material is embodied as a fabric, in particular as a non-woven. The absorbent material can be made of one material or can comprise a material blend.

A further advantage results if the measuring device is embodied to measure a humidity and/or a temperature. Since the liquid that enters through the leak influences the moisture, and possibly the temperature, of the fluid, the leak can be reliably detected using a measuring device of this type. For this purpose, the measuring device can comprise one or more sensors, in particular a moisture sensor and/or a temperature sensor. In addition, the measuring device can be embodied for measuring additional physical properties and/or variables of the fluid and can comprise corresponding sensors therefor.

Advantageously, the at least one pipe comprises a shut-off valve. This is normally expedient if multiple pipes are provided which are connected to a single shared measuring device. Thus, for each pipe, the fluid conducted through the pipe can be analyzed separately. Even if only one pipe is provided, it can be beneficial for maintenance work if the pipe can be shut off.

To ensure that an applied negative pressure or a suction force is not too large, it can be provided that the suction device comprises a regulator with which a suction force can be set to a defined value, in particular to a value between 0.1 bar and 1 bar, particularly preferably between 0.2 bar and 0.3 bar. With a measure of this type, it is prevented that the absorbent material is compressed, whereby a removal of the fluid would be impeded. Typically, the regulator comprises a variable valve. If necessary, the suction device can comprise a pressure measuring device.

It can be provided that the at least one pipe is installed at least partially above the absorbent material. As a result of this arrangement, it is ensured that the absorbent material rests flat. In addition, if a layer, for example an insulation, is installed above the device or the absorbent material, recesses for the pipe can possibly be provided. Alternatively, a deformable layer can be provided which fits snugly around the pipe.

It is beneficial if, at the second end, the at least one pipe comprises a suction piece which can be or is attached to the absorbent material. It is thus ensured that the suctioned fluid comes directly from the absorbent material.

Advantageously, multiple pipes are provided which are in fluid connection with the suction device. A leak detection or a measurement is thus enabled in multiple measuring regions, wherein each pipe leads into a measuring region.

To simplify a design, it can be provided that the pipes open into a shared collector, wherein the suction device is in fluid connection with the pipes via the collector. Thus, only a single suction device is required which is indirectly connected to the pipes via the collector.

Particularly preferably, it is provided that the measuring device is positioned between the suction device and the collector. As a result, only a single measuring device is necessary, with which measuring device the fluid from the pipes can be analyzed. For this purpose, it can be advantageous if each pipe additionally comprises a shut-off valve so that the fluid from each pipe can be analyzed separately in that only one pipe is opened at a time. Alternatively, a separate measuring device can be provided for each pipe.

It is expedient if the absorbent material is embodied as a non-woven layer, wherein the non-woven layer comprises, at least on one side, preferably on both sides, a perforated coating, in particular a perforated PVC coating. In this case, the absorbent material, in particular the non-woven, is embodied to be planar in order to form a non-woven layer. The non-woven layer comprises a top side and a bottom side, wherein the top side and/or the bottom side can be coated with PVC. Advantageously, the coating comprises multiple openings so that the moisture or the fluid can penetrate into the absorbent material.

The other object is attained with a structure of the type named at the outset, wherein the absorbent material is arranged between the lower layer and the upper layer and the structure comprises multiple measuring regions, wherein for each measuring region at least one corresponding pipe is provided, the second end of which is positioned in the respective measuring region. The structure can be any desired building object.

An advantage obtained thereby is in particular that a leak can be detected in different regions, whereby a localization of the leak is enabled. The more pipes provided, the smaller the corresponding measuring regions. As a result, a precision of the localization is increased. For this purpose, it can be provided that the absorbent material is embodied such that the different measuring regions are contiguous, or that no physical barriers are present between these regions.

The structure can also be divided into hypothetical measuring regions. These essentially comprise a certain area in the region of the second end of the pipe. If necessary, the measuring regions can overlap. Alternatively, it can be provided that, for the measuring regions, respectively one absorbent material and/or one physical barrier between the measuring regions is provided. A physical barrier can be a water-repellent plastic, for example.

In addition, the other object is attained with a use of a device of this type for detecting and/or localizing a leak in closure elements, such as for example walls, a floor and/or a ceiling, particularly in wet rooms, or in roofs, while utilizing the advantages mentioned.

Furthermore, the method-related object is attained with a method of the type named at the outset in that the fluid is removed from an absorbent material and conducted to a measuring device, wherein at least one measured value of the fluid is acquired using the measuring device, which measured value is compared with at least one other measured value.

An advantage obtained thereby is in particular that the fluid is removed directly from the absorbent material in which a moisture has accumulated, whereby a leak is detected at an early stage. For this purpose, a continuous acquisition of measured values can take place, for example, wherein a change in the current measured value compared to preceding measured values indicates a leak. This is the case, for example, when a measured moisture level has increased compared to a previously measured moisture level.

Preferably, the fluid is removed from multiple measuring regions through corresponding pipes, wherein separate measured values are acquired for the measuring regions. In this manner, each measuring region can be separately checked for a leak.

Furthermore, it is beneficial if the acquired measured values are compared in order to localize a leak in the measuring region whose measured value deviates from the other measured values in excess of a tolerance interval. No previous measurement is therefore necessary, since the other measured values serve as a reference, for example. To evaluate and analyze or compare the measured values, an analysis unit or evaluation unit can be provided. The tolerance interval is typically specified by a fluctuation range for the measurement, wherein only a deviation that exceeds this tolerance interval is classified as a significant deviation.

Figure 2:
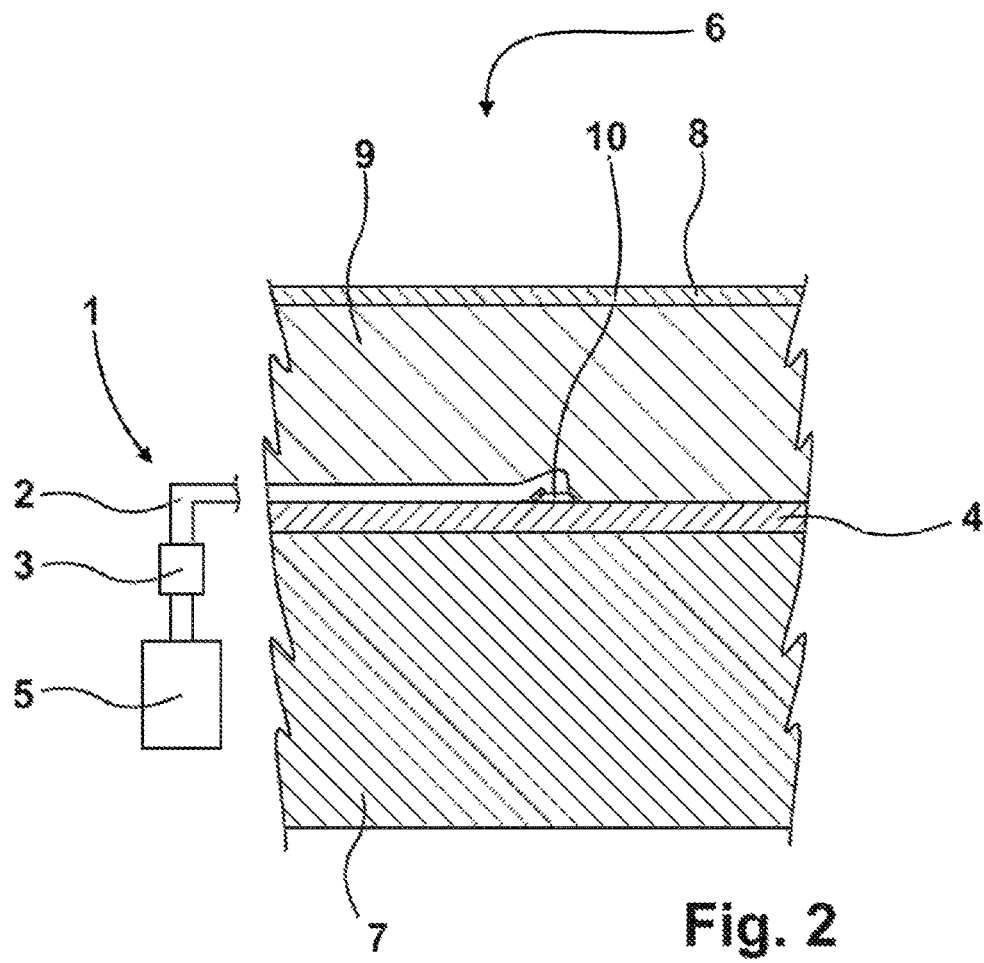
Figure 3:
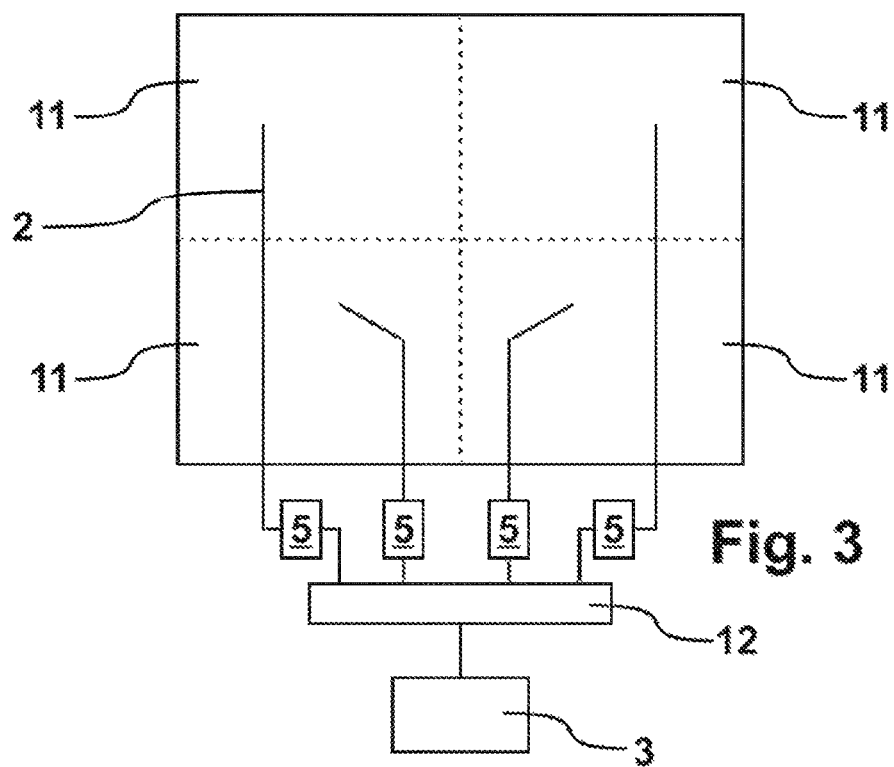
Figure 4:
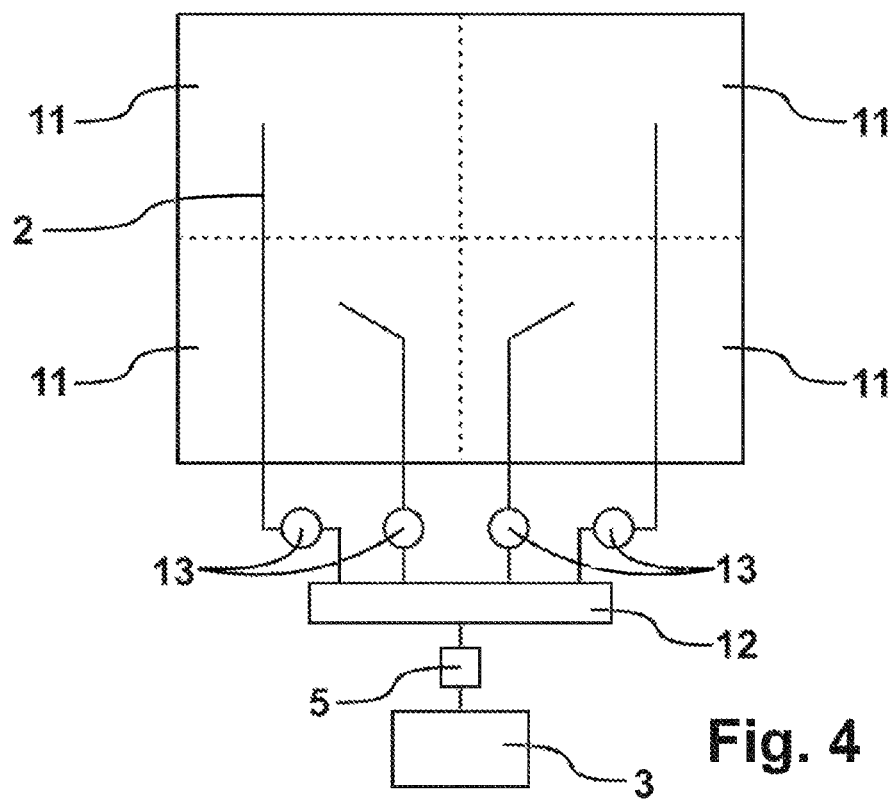

Additional features, advantages, and effects follow from the exemplary embodiments described below. The drawings which are thereby referenced show the following:

FIG. 1 A schematic illustration of a device according to the invention;

FIG. 2 A roof structure with a device for detecting a leak;

FIG. 3 A schematic illustration of a device with multiple measuring devices;

FIG. 4 A schematic illustration of a device with multiple shut-off valves.

FIG. 1 shows a simple variant of a device 1 according to the invention for detecting a leak. In this case, the device 1 comprises a pipe 2, wherein a first end of the pipe 2 is in fluid connection with a suction device 3. A second end of the pipe 2 is essentially positioned in or on an absorbent material 4, so that the pipe 2 leads from the absorbent material 4 to the suction device 3. In addition, a measuring device 5 for analyzing a fluid is arranged between the absorbent material 4 and the suction device 3 in a direction of flow. Typically, the measuring device 5 comprises at least one sensor, in particular multiple sensors, for analyzing the fluid. The sensor or sensors are expediently embodied as a moisture sensor and/or temperature sensor. Normally, the measuring device 5 is positioned such that the fluid conducted in the pipe 2 can be measured therewith. The pipe 2 is normally embodied as a hose or tube. An inner diameter of the pipe 2 is preferably less than 15 mm, in particular less than 10 mm, particularly preferably less than 5 mm. Typically, a pipe 2 with an inner diameter of approximately 2 mm is used. An, in particular flexible, plastic can be used as material for the pipe 2.

For this purpose, as shown in the schematic illustration, the first end of the pipe 2 can essentially open into the measuring device 5, wherein the measuring device 5 is in turn connected to the suction device 3 via a piece of pipe. In this case, the measuring device 5 can comprise an interior space which can be filled with the fluid, in which space the at least one sensor is arranged. Alternatively, the pipe 2 can essentially lead through the measuring device 5, wherein the at least one sensor preferably protrudes into an interior space of the pipe 2. To implement the measuring device 5 in a small installation space, it can be provided that the at least one sensor is arranged in the interior space of the pipe 2 or protrudes into this space.

The absorbent material 4 typically comprises a plurality of cavities, pores, capillaries, or the like, which can be filled with a fluid, in particular by a gas, such as an ambient air, for example. If the absorbent material 4 absorbs a liquid entering through the leak, a moisture level of the fluid in these cavities is increased. In order to analyze the fluid, and possibly measure the moisture level and/or the temperature, the fluid is essentially suctioned by the suction device 3 and, as a result, conveyed out of the absorbent material 4 and through the pipe 2. It is beneficial if the absorbent material 4 comprises a fabric such as a non-woven, for example. Alternatively, the absorbent material 4 can be composed of a wool insulation. The absorbent material 4 can essentially be shaped in any desired manner. For example, the absorbent material 4 can form a sphere, a square or cube, or a pillow-like shape. Typically, however, the absorbent material 4 is embodied to be planar, for example as a layer, coat, or membrane.

Particularly preferably, the absorbent material 4 is embodied as a non-woven layer that is provided on both sides with a perforated PVC coating.

In FIG. 2, a multilayer structure 6, for example a flat roof, with a device 1 for detecting a leak is illustrated. The structure 6 comprises a bottom layer 7, for example a poured-concrete ceiling, and an upper layer 8, for example a sealing layer. Between the lower layer 7 and the upper layer 8, typically multiple layers such as a vapor barrier, an insulation 9, additional sealing layers, and possibly a non-woven are provided. In the exemplary embodiment shown, the absorbent material 4 is arranged between the upper and the lower layer 7. In addition, the insulation 9 is provided between the upper layer 8 and the absorbent material 4. A non-woven, which is in any case normally used with flat roofs, is preferably provided as absorbent material 4.

No additional material is therefore required.

In this embodiment, the pipe 2 comprises at the second end an optional suction piece 10 with which the pipe 2 is attached to the absorbent material 4. Independent of whether a suction piece 10 is present or not, it can furthermore be provided that the pipe 2 is installed above the absorbent material 4.

For example, if the sealing layer and/or the insulation 9 have a leak, as a result of which a liquid can seep through to the absorbent material 4, the absorbent material 4 absorbs this liquid before the liquid reaches the bottom layer 7. In this case, the moisture level, primarily a humidity, is increased particularly in the region of the absorbent material 4. Through the application of a negative pressure to the pipe 2 by means of the suction device 3, the fluid, for example an air, can then be suctioned out of the absorbent material 4, or out of the cavities in the absorbent material 4, and conducted through the measuring device 5, or past the sensor or sensors of the measuring device 5. The suctioned fluid is analyzed using the measuring device 5, wherein a changed measured value of the humidity and/or of the temperature, for example, indicates a leak.

In addition, the liquid that enters, which possibly collects between the lower and upper layer 8, can be pumped off through the pipe 2.

In FIG. 3, an area, in particular a roof area, is shown which is divided into four, in particular hypothetical, measuring regions 11. The device 1 for detecting a leak is in this case embodied with four pipes 2, wherein each pipe 2 leads into a different measuring region 11. Here, one measuring device 5 each is assigned to the pipes 2, wherein the pipes 2 open into a shared collector 12 after the measuring device 5. The collector 12 is in turn in fluid connection with the suction device 3, for example via another pipe 2.

To check the area for a leak, a negative pressure can then be applied to all pipes 2 simultaneously, wherein the fluid removed from the respective measuring region 11 is analyzed in the corresponding measuring device 5. If, for example, a measured value from a first measuring region 11 deviates from the measured values for the other measuring regions 11, this indicates an abnormality. For example, if the measured value for a humidity from the first measuring region 11 is higher than that from the other measuring regions 11, there is a high likelihood of at least one leak in the first measuring region 11. Conversely, a low measured value in the first measuring region 11 compared to the measured values from the other measuring regions 11 can respectively indicate at least one leak or permeable locations in these regions.

In FIG. 4, an alternative embodiment is illustrated, wherein the roof area or another part of a building is also divided into four measuring regions 11. In this case, the pipes 2 each comprise a shut-off valve 13. After the shut-off valve 13, the pipes 2 open into the shared connector 12, which is in fluid connection with the suction device 3. In this embodiment, the measuring device 5 is arranged between the suction device 3 and the connector 12, whereby only one measuring device 5 is necessary. To carry out the method described above, one shut-off valve 13 can then be opened at a time and a negative pressure can thus be applied to the corresponding pipe 2. A fluid is thereby removed from the corresponding measuring region 11 and analyzed in the measuring device 5. This procedure can be repeated for multiple, in particular all, measuring regions 11, whereupon the measured values acquired are compared as described above. To compare the measured values, the measuring device 5 or the measuring devices 5 are preferably connected to an evaluation unit.

Of course, the area to be monitored can be divided into any desired number of measuring regions 11, wherein a quantity of pipes 2 is at least equal to a quantity of measuring regions 11.

The more measuring regions 11 provided and/or the smaller they are, the more precisely the leak can be localized.

With a device 1 of this type, it is thus on the one hand possible to detect a leak reliably and at an early stage. On the other hand, it is also possible to narrow down the position of the leak to a specific region. The field of application for a device 1 of this type is, however, not limited to roofs such as flat roofs, for example.

Such a device 1 can also be used to monitor walls or other closure elements that are supposed to be leak-tight, for example in basements and/or wet rooms. Furthermore, all features that were described for a single pipe 2 can be provided for any desired quantity of pipes 2, and in particular for all pipes 2, of the device 1.

The invention claimed is:

1. A device for detecting a leak in a building comprising:
   at least one pipe in which a fluid in the building is conducted;
   an absorbent material arranged in the building;
   a suction device coupled in fluid connection with a first end of the at least one pipe and a second end of the at least one pipe in fluid connection with the absorbent material to convey fluid out of the absorbent material via the suction device; and
   at least one measuring device for analyzing the fluid in the at least one pipe.

2. The device according to claim 1, wherein the absorbent material is embodied to be planar.

3. The device according to claim 1, wherein the measuring device is embodied for measuring at least one of a humidity or a temperature.

4. The device according to claim 1, wherein the at least one pipe comprises a shut-off valve.

5. The device according to claim 1, wherein the suction device comprises a regulator with which a suction force is set to a defined value.

6. The device according to claim 5, wherein the defined value to which the suction force of the regulator is set is a value between 0.1 bar and 1 bar.

7. The device according to claim 5, wherein the defined value to which the suction force of the regulator is set is a value between 0.2 bar and 0.3 bar.

8. The device according to claim 1, wherein the at least one pipe is installed at least partially above the absorbent material.

9. The device according to claim 1, wherein, at the second end, the at least one pipe comprises a suction piece which is attachable to the absorbent material.

10. The device according to claim 1, wherein the at least one pipe comprises multiple pipes in fluid connection with the suction device.

11. The device according to claim 10, wherein the multiple pipes open into a shared collector, wherein the suction device is in fluid connection with the multiple pipes via the collector.

12. The device according to claim 1, wherein the measuring device is positioned between the suction device and the collector.

13. The device according to claim 1, wherein the absorbent material is embodied as a non-woven layer comprising, at least on one side, a perforated coating.

14. The device according to claim 13, wherein the non-woven layer comprises a perforated PVC coating on both sides.

15. A structure in a building with a lower layer, an upper layer, and a device according to claim 1, wherein the absorbent material is arranged between the lower layer and the upper layer, the structure comprising:
    multiple measuring regions; and
    the at least one pipe comprises a plurality of pipes;
    wherein at least one of the plurality of pipes is designated for each measuring region, and the second ends of the plurality of pipes are positioned in respective measuring regions.

16. The structure according to claim 15 being at least one of a roof, a wall, a ceiling, a floor or a wet room of the building, wherein the multiple measurement regions are located in the at least one of the roof, the wall, the ceiling, the floor, or the wet room of the building.

17. The device according to claim 1 being arranged to detect a leak in at least one of a roof, a wall, a ceiling, a floor or a wet room of the building, wherein the absorbent material is arranged in the at least one of the roof, the wall, the ceiling, the floor, or the wet room of the building.

18. A method for detecting a leak in a building, wherein an absorbent material is arranged in the building, the method comprising:
    applying a negative pressure to a first end of at least one pipe in the building using a suction device in order to suction through the at least one pipe a fluid from a second end of the at least one pipe in fluid connection with the absorbent material, whereby the fluid is conveyed out of the absorbent material and conducted to a measuring device; and
    acquiring at least one measured value of the fluid using the measuring device, and comparing the at least one measured value with at least one other measured value.

19. The method according to claim 18, wherein the at least one pipe comprises a plurality of pipes, wherein the fluid is removed from multiple measuring regions through the plurality of pipes, and wherein separate measured values are acquired for the multiple measuring regions.

20. The method according to claim 19, wherein the separate acquired measured values are compared in order to localize a leak in at least one of the multiple measuring regions in which an acquired measured value deviates from the other acquired measured values in excess of a tolerance interval.

21. The method according to claim 18 being performed to detect a leak in at least one of a roof, a wall, a ceiling, a floor or a wet room of the building.

* * * * *